US008571333B2

(12) United States Patent
Denney et al.

(10) Patent No.: US 8,571,333 B2
(45) Date of Patent: Oct. 29, 2013

(54) DATA CLUSTERING

(75) Inventors: Bradley Scott Denney, Irvine, CA (US); Anoop Korattikara Balan, Irvine, CA (US)

(73) Assignee: Canon Kabushiki Kaisha, Tokyo (JP)

(*) Notice: Subject to any disclaimer, the term of this patent is extended or adjusted under 35 U.S.C. 154(b) by 471 days.

(21) Appl. No.: 12/906,106

(22) Filed: Oct. 17, 2010

(65) Prior Publication Data

US 2012/0093424 A1    Apr. 19, 2012

(51) Int. Cl.
*G06K 9/62* (2006.01)

(52) U.S. Cl.
USPC ............................ 382/225; 382/224

(58) Field of Classification Search
USPC ................................. 382/224, 225
See application file for complete search history.

(56) References Cited

U.S. PATENT DOCUMENTS

| | | | | |
|---|---|---|---|---|
| 5,537,488 A * | 7/1996 | Menon et al. | ........... | 382/170 |
| 6,122,628 A * | 9/2000 | Castelli et al. | ........... | 1/1 |
| 6,229,918 B1 * | 5/2001 | Toyama | ........... | 382/173 |
| 7,227,985 B2 * | 6/2007 | Ikeda et al. | ........... | 382/159 |
| 7,305,133 B2 * | 12/2007 | Divakaran | ........... | 382/225 |
| 7,890,445 B2 * | 2/2011 | Ben Hur et al. | ........... | 706/45 |
| 8,094,948 B2 * | 1/2012 | Jain et al. | ........... | 382/225 |
| 8,150,098 B2 * | 4/2012 | Gallagher et al. | ........... | 382/100 |
| 8,358,857 B2 * | 1/2013 | Demirci et al. | ........... | 382/225 |
| 2002/0097914 A1 * | 7/2002 | Yaung | ........... | 382/225 |
| 2003/0169919 A1 * | 9/2003 | Ikeda et al. | ........... | 382/159 |
| 2011/0305399 A1 * | 12/2011 | Zitnick et al. | ........... | 382/225 |

OTHER PUBLICATIONS

Kuncheva et al., Using diversity in cluster ensembles, 2004 IEEE, pp. 1214-1219.*
R.M. Corless, et al., "On the LambertW Function", Advances in Computational Mathematics, vol. 5, Issue 1, pp. 329-359, 1996.
L. Hubert, et al., "Comparing Partitions", Journal of Classification, vol. 2, Issue 1, pp. 193-218, 1985.
C. Lanczos, "A Precision Approximation of the Gamma Function", Journal of the Society for Industrial and Applied Mathematics: Series B, Numerical Analysis, vol. 1, pp. 86-96, 1964.
M. Meil, "Comparing Clusterings: An Axiomatic View", Proceedings of the 22nd International Conference on Machine Learning, ACM, pp. 577-584, 2005.
W.M. Rand, "Objective Criteria for the Evaluation of Clustering Methods", Journal of the American Statistical Association, pp. 846-850, 1971.

(Continued)

*Primary Examiner* — John Strege
(74) *Attorney, Agent, or Firm* — Fitzpatrick, Cella, Harper & Scinto

(57) ABSTRACT

A clustering procedure for grouping a set of images is selected from amongst plural clustering procedures. A predetermined categorization of objects such as images is input, and image features are extracted from each image in the set of images. A comparison measure is determined, by which to compare respective features of the set of images. Respective features between the images in the set of images are compared, based on the comparison measure, and a group of measures representing the differences between features of respective images is output. The plural clustering procedures are applied to the set of images to cluster the images based in part on the calculated group of measures. A clustering quality score is generated for each clustering procedure, based on the clusters created by the clustering procedure and the predetermined categorization of images. The clustering procedure with a high clustering quality score is selected.

15 Claims, 7 Drawing Sheets

(56) References Cited

OTHER PUBLICATIONS

A. Strehl, et al., "Cluster Ensembles—A Knowledge Reuse Framework for Combining Multiple Partitions", The Journal of Machine Learning Research, vol. 3, pp. 583-617, 2003.

N.M. Temme, "Asymptomatic Estimates of Stirling Numbers", Stud. Appl. Math., vol. 89, Issue 3, pp. 233-243, 1993.

N.X. Vinh, et al., "Information Theoretic Measures for Ciusterings Comparison: Is a Correction for Chance Necessary?", Proceedings of the 26th Annual International Conference on Machine Learning, ACM, pp. 1073-1080, 2009.

* cited by examiner

| $v/\nu$ | $v_1$ | $v_2$ | ... | $v_c$ | Sums |
|---|---|---|---|---|---|
| $u_1$ | $M_{11}$ | $M_{12}$ | ... | $M_{1C}$ | $a_1$ |
| $u_2$ | $M_{21}$ | $M_{22}$ | ... | $M_{2C}$ | $a_2$ |
| ⋮ | ⋮ | ⋮ | ⋱ | ⋮ | ⋮ |
| $u_R$ | $M_{R1}$ | $M_{R2}$ | ... | $M_{RC}$ | $a_R$ |
| Sums | $b_1$ | $b_2$ | ... | $b_C$ | N |

FIG. 5A

| 2 | 0 |
|---|---|
| 0 | 2 |

(a) U vs. V1

| 2 | 0 | 0 |
|---|---|---|
| 0 | 1 | 1 |

(b) U vs. V2

| 1 | 1 | 0 | 0 |
|---|---|---|---|
| 0 | 0 | 1 | 1 |

DATA CLUSTERING

FIELD

The present disclosure relates to data clustering, and more particularly relates to procedures for clustering of objects into clusters of related objects, such as clustering of a group of images into one or more clusters of related images.

BACKGROUND

In the field of digital imaging, it is common to partition a large set of images into smaller clusters of images. For example, a PC or camera may organize a large collection of images into a small number of groups of images similar to each other. To that end, a number of different clustering procedures have been developed, to automatically cluster images based on features of the images.

The performance of a clustering procedure may vary depending on the set of images being clustered. Thus, in some situations it may be better to choose one clustering procedure over another.

SUMMARY

To compare clusterings, a Mutual Information (MI) measure has been developed. The MI measures how closely two different clustering procedures place the same objects in the same clusters.

One shortcoming of MI is that MI only compares one clustering against another. MI can indicate a similarity between two clusterings, but does not account for which (if either) of the clusterings is "true" or correct. For example, some MI procedures result in the same symmetric MI score for either of the two clusterings, implying that the MI procedure simply compares the two clusters to another without regard for either of the clusters being "true". Thus, while MI can indicate cluster similarity, it does not provide a user with an indication of a specific clustering procedure that would work best for a set of objects, i.e., which clustering procedure would best approximate a manual clustering performed by the user.

The foregoing situation is addressed by comparing results from a set of clustering procedures against a predetermined categorization of images to generate respective scores for each clustering procedure, and selecting the clustering procedure with the highest score.

Thus, in an example embodiment described herein, a clustering procedure for grouping a set of images is selected from amongst plural clustering procedures. A predetermined categorization of objects such as images is input, and image features are extracted from each image in the set of images. A comparison measure is determined, by which to compare respective features of the set of images. Respective features between the images in the set of images are compared, based on the comparison measure, and a group of measures representing the differences between features of respective images is output. The plural clustering procedures are applied to the set of images to cluster the images based in part on the calculated group of measures. A clustering quality score is generated for each clustering procedure, based on the clusters created by the clustering procedure and the predetermined categorization of images. The clustering procedure with a high clustering quality score is selected.

By comparing a set of clustering procedures against a fixed "true" categorization of images to generate respective scores for each clustering procedure, it is ordinarily possible to automatically choose a clustering procedure which will group images in a manner best approximating a grouping performed manually by a user.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 5A is a view depicting a contingency table for explaining clustering according to an example embodiment.

FIG. 5B is a view for explaining mutual information.

FIG. 5C is a view for explaining elements of a cluster according to an example embodiment.

DETAILED DESCRIPTION

Figure 1:
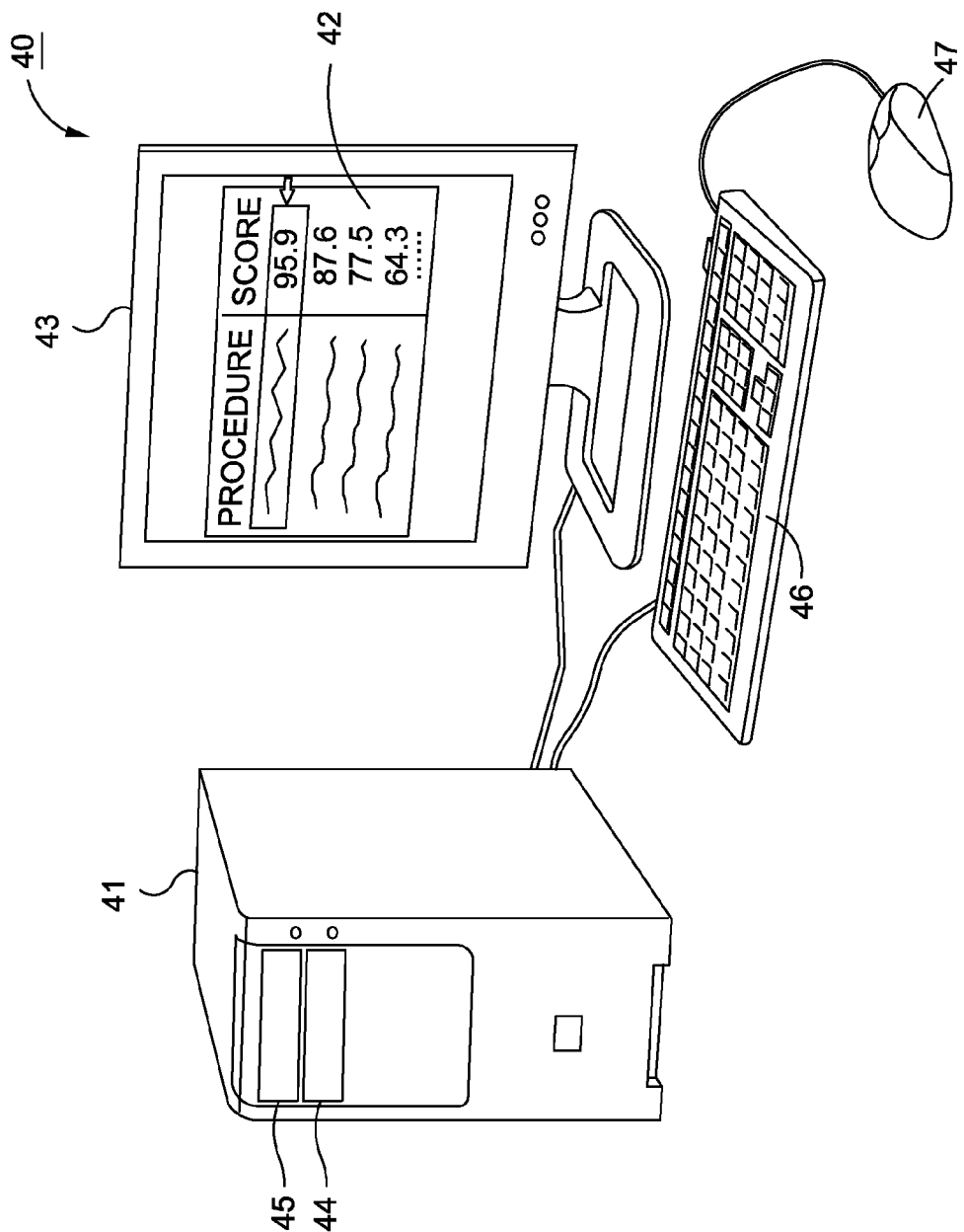
FIG. 1 is a representative view of computing equipment relevant to one example embodiment.

FIG. 1 is a representative view of computing equipment relevant to one example embodiment. Computing equipment 40 includes host computer 41 which generally comprises a programmable general purpose personal computer (hereinafter "PC") having an operating system such as Microsoft® Windows® or Apple® Mac OS® or LINUX, and which is programmed as described below so as to perform particular functions and in effect to become a special purpose computer when performing these functions. Computing equipment 40 includes color monitor 43 including display screen 42, keyboard 46 for entering text data and user commands, and pointing device 47. Pointing device 47 preferably comprises a mouse for pointing and for manipulating objects displayed on display screen 42.

Host computer 41 also includes computer-readable memory media such as computer hard disk 45 and DVD disk drive 44, which are constructed to store computer-readable information such as computer-executable process steps. DVD disk drive 44 provides a means whereby host computer 41 can access information, such as image data, computer-executable process steps, application programs, etc. stored on removable memory media. Other devices for accessing information stored on removable or remote media may also be provided.

Host computer 41 may acquire digital image data from other sources such as a digital video camera, a local area network or the Internet via a network interface. Likewise, host computer 41 may interface with other color output devices, such as color output devices accessible over a network interface.

Display screen 42 displays a list of clustering procedures and a respective score for each procedure, along with a selection of the clustering procedure with the highest score. In that regard, while the below process will generally be described with respect to images for purposes of conciseness, it should be understood that other embodiments could also operate on other objects. For example, other embodiments could be directed to selecting a clustering procedure for clustering audio files, or moving image files.

While FIG. 1 depicts host computer 41 as a personal computer, computing equipment for practicing aspects of the present disclosure can be implemented in a variety of embodiments, including, for example, a digital camera, mobile devices such as cell phones, ultra-mobile computers, netbooks, portable media players or game consoles, among many others.

Figure 2:
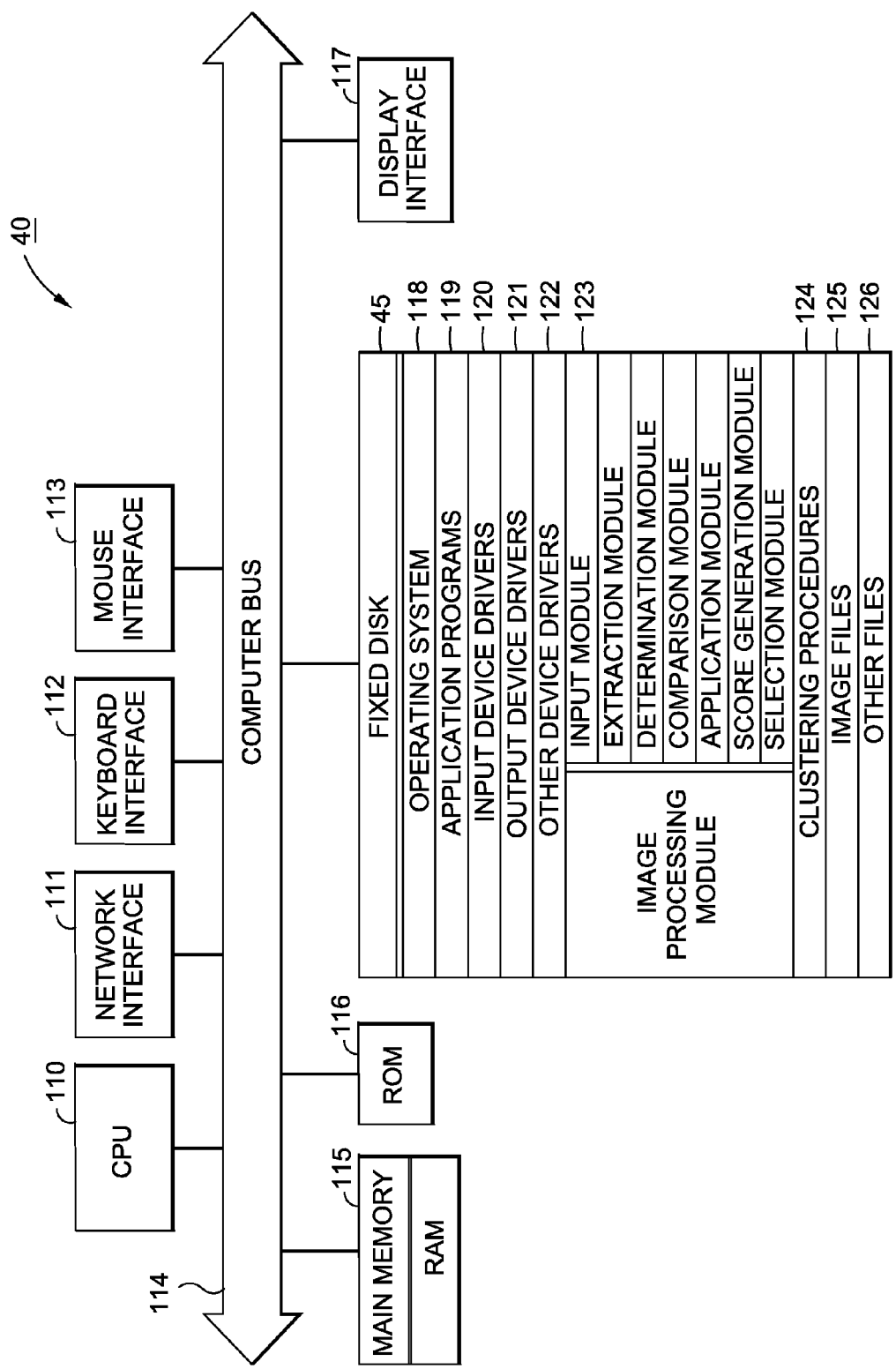
FIG. 2 is a detailed block diagram depicting the internal architecture of the host computer shown in FIG. 1.

FIG. 2 is a detailed block diagram showing the internal architecture of host computer 41 of computing equipment 40. As shown in FIG. 2, host computer 41 includes central processing unit (CPU) 110 which interfaces with computer bus 114. Also interfacing with computer bus 114 are hard disk 45, network interface 111, random access memory (RAM) 115 for use as a main run-time transient memory, read only memory (ROM) 116, display interface 117 for monitor 43, keyboard interface 112 for keyboard 46, and mouse interface 113 for pointing device 47.

RAM 115 interfaces with computer bus 114 so as to provide information stored in RAM 115 to CPU 110 during execution of the instructions in software programs such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data such as color images or other information can be stored in RAM 115, so that the data can be accessed by CPU 110 during the execution of computer-executable software programs, to the extent that such software programs have a need to access and/or modify the data.

As also shown in FIG. 2, hard disk 45 contains computer-executable process steps for operating system 118, and application programs 119, such as graphic image management programs. Hard disk 45 also contains computer-executable process steps for device drivers for software interface to devices, such as input device drivers 120, output device drivers 121, and other device drivers 122. Clustering procedures 124 include a set of clustering procedures for clustering image files, audio files or other data. Image files 125, including color image files, and other files 126 are available for output to color output devices and for manipulation by application programs.

Image processing module 123 comprises computer-executable process steps, and generally comprises an input module, an extraction module, a determination module, a comparison module, an application module, a score generation module, and a selection module. Image processing module 123 inputs a set of images, and outputs a selection of a clustering procedure which best fits the set of images. More specifically, image processing module 123 comprises computer-executable process steps executed by a computer for causing the computer to perform a method for selecting a clustering procedure for grouping the set of images, as described more fully below.

The computer-executable process steps for image processing module 123 may be configured as a part of operating system 118, as part of an output device driver such as a printer driver, or as a stand-alone application program such as a color management system. They may also be configured as a plug-in or dynamic link library (DLL) to the operating system, device driver or application program. For example, image processing module 123 according to example embodiments may be incorporated in an output device driver for execution in a computing device, such as a printer driver, embedded in the firmware of an output device, such as a printer, in an input/output device such as a camera with a display, in a mobile output device (with or without an input camera) such as a cell-phone or music player, or provided in a stand-alone image management application for use on a general purpose computer. It can be appreciated that the present disclosure is not limited to these embodiments and that the disclosed image processing module 123 may be used in other environments in which image clustering is used.

Figure 3:
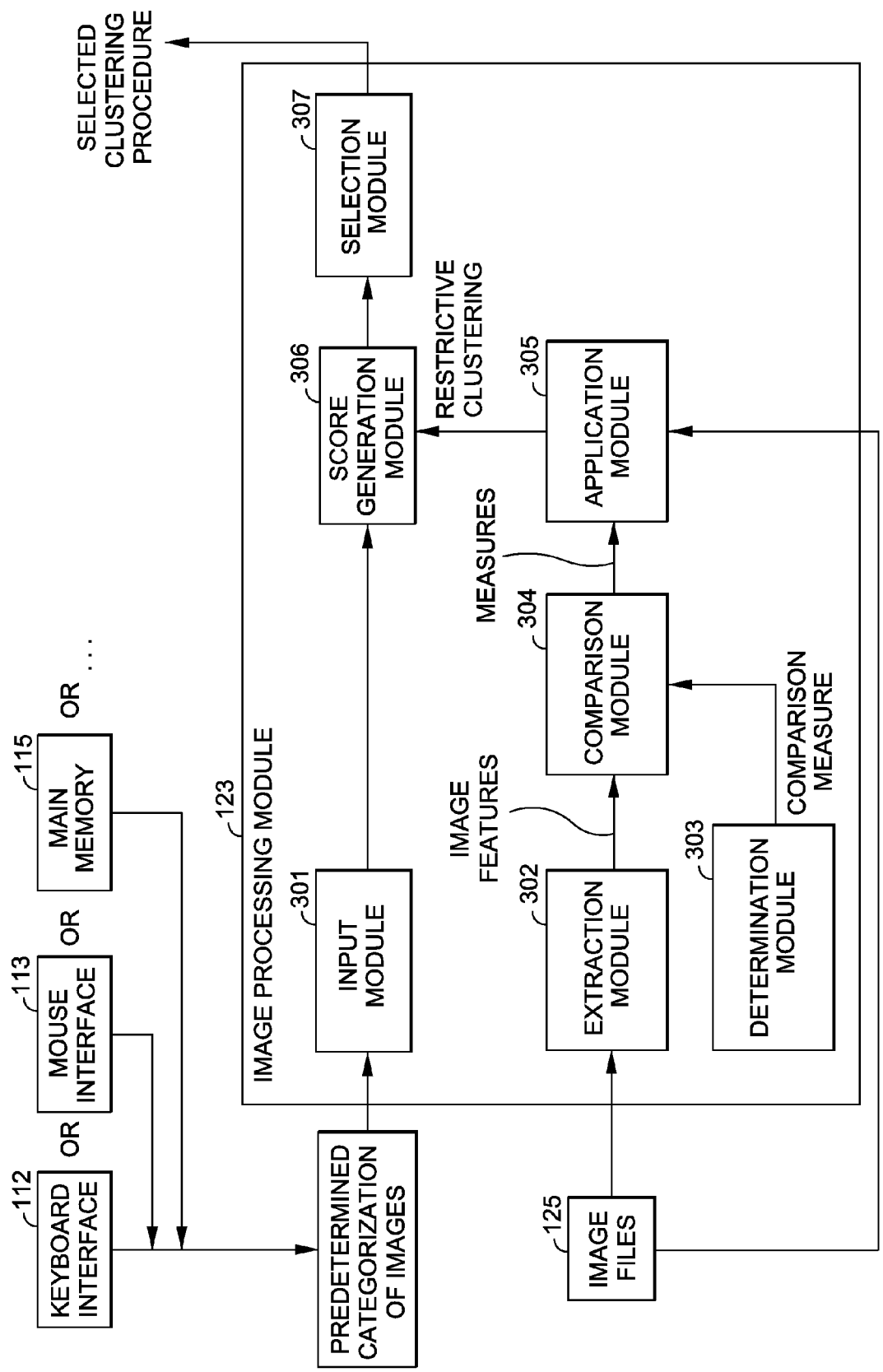
FIG. 3 is a representational view of an image processing module according to an example embodiment.

FIG. 3 illustrates the image processing module of FIG. 2 according to an example embodiment.

In particular, FIG. 3 illustrates an example architecture of image processing module 123 in which the sub-modules of image processing module 123 are included in fixed disk 45. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, image processing module 123 includes an input module 301 for inputting color images and a predetermined categorization of the images, an extraction module 302 for extracting image features from each image in the set of images, and a determination module 303 for determining a comparison measure by which to compare respective features of the set of images. Comparison module 304 compares respective features between the images in the set of images based on the comparison measure, and outputs a group of measures representing the differences between features of respective images. Application module 305 applies plural clustering procedures to the set of images to cluster the images based in part on the calculated group of measures. Score generation module 306 generates a clustering quality score for each clustering procedure, based on the clusters created by the clustering procedure and the predetermined categorization of images. Selection module 307 selects a clustering procedure with a high clustering quality score. Each of these functions will be described more fully below.

Figure 4:
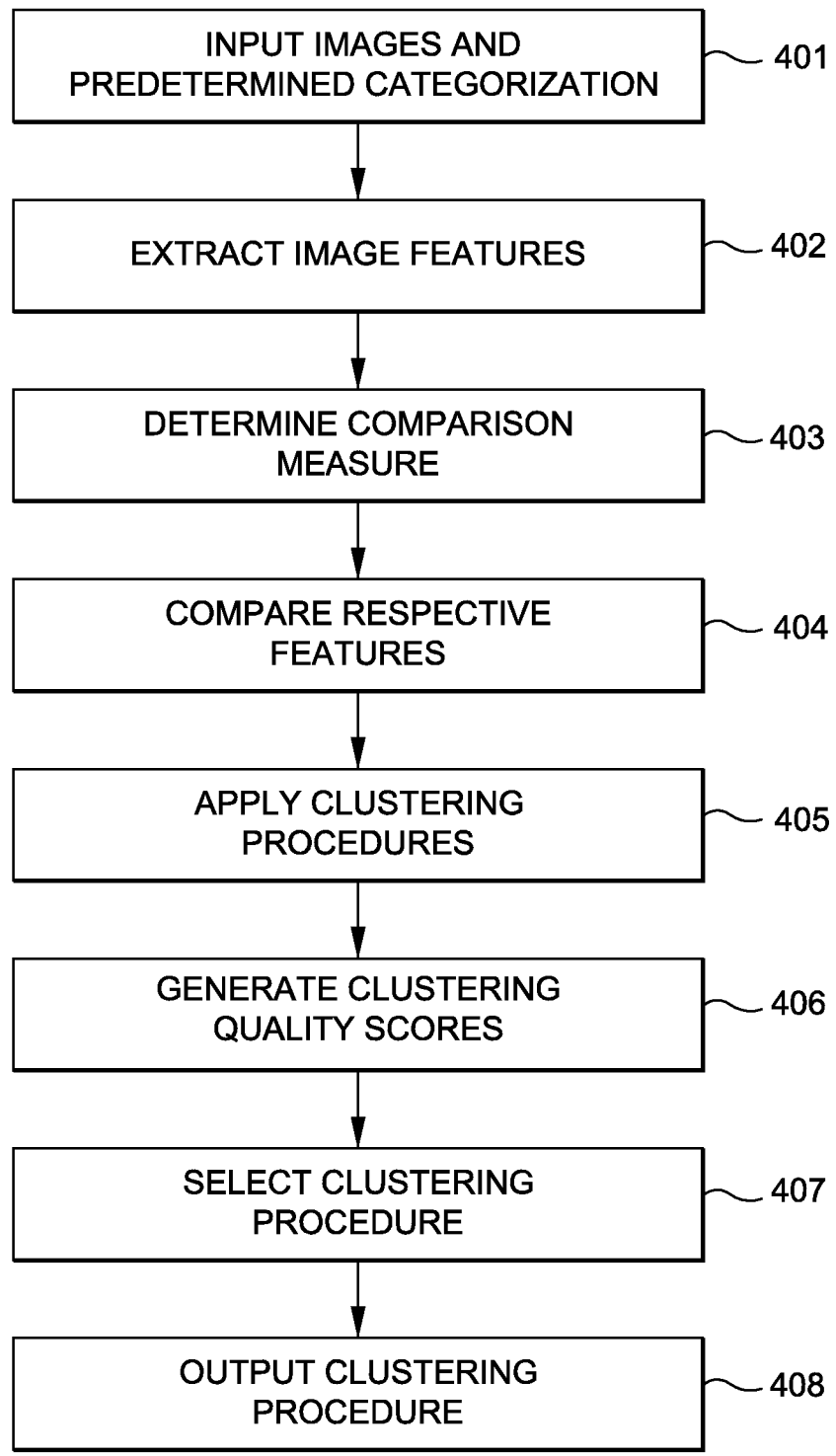
FIG. 4 is a flow diagram for explaining selection of a clustering procedure according to an example embodiment.

FIG. 4 is a flow diagram for explaining selection of a clustering procedure for grouping a set of images.

Briefly, in FIG. 4, a clustering procedure for grouping a set of images is selected from amongst plural clustering procedures. A predetermined categorization of objects such as images is input, and image features are extracted from each image in the set of images. A comparison measure is determined, by which to compare respective features of the set of images. Respective features between the images in the set of images are compared, based on the comparison measure, and a group of measures representing the differences between features of respective images is output. The plural clustering procedures are applied to the set of images to cluster the images based in part on the calculated group of measures. A clustering quality score is generated for each clustering procedure, based on the clusters created by the clustering procedure and the predetermined categorization of images. The clustering procedure with a high clustering quality score is selected.

In more detail, in step 401, a set of images are input, along with a predetermined categorization of the images. In that regard, the predetermined categorization of images can be selected by a user, generated based on past categorizations of images, or generated using pre-labeled learning set of images, among other methods. For example, multiple user selections of categorizations could be aggregated and stored, or transmitted to computing equipment 40 over a network. Of course, the predetermined categorization could also be adjusted or modified over time, to keep up with changes in categorizations by users.

In step 402, image features are extracted from all of the input images. For example, colors, shapes, and other features can be extracted, depending on which comparison measure is to be used. In that regard, in many cases, clustering is not performed on the actual data, but on features extracted from it. For example, an procedure for clustering images of cars does not usually operate in the pixel space of the images, but instead works with features such as color or shape extracted from the images.

In step 403, a comparison measure is determined, by which to compare respective features of the set of images. For example, the comparison measure could be a chi-squared distance, a "histogram intersection" measure, Cosine distance, Tanimoto coefficient, Lp distances, Earth movers distance, or Hamming distance, among many others.

In step 404, respective features between the images in the set of images are compared based on the comparison measure, and a group of measures representing the differences between features of respective images is output. In particular, each image is compared against every other image in the set, and the output measures indicate how similar (or different) the images are according to the selected comparison measure.

In step 405, the plural clustering procedures are applied to the set of images to cluster the images, based in part on the calculated group of measures. In that regard, nearly every clustering procedure uses at least one such measure in the clustering process. Thus, each clustering procedure is executed on the set of images, based in part on the calculated set of measures, to generate resultant clusters. In that regard, it should be understood that each clustering procedure involves a choice of feature, comparison measure, and specific clustering process. Thus, this step contemplates that the same clustering procedure could be used multiple times but with differing parameters, to thereby produce different results.

In step 406, a clustering quality score is generated for each clustering procedure, based on the clusters created by the clustering procedure and the predetermined categorization of images.

For example, the clustering quality score can be generated for each clustering procedure by calculating mutual information between the clustering procedure and the predetermined categorization of images, and adjusting by a penalty factor indicating expected mutual information from randomly assigning images to clusters of the clustering procedure.

In one example, the clustering quality score (AMI*) is generated according to $$AMI* = \frac{\hat{I}(M) - E[\hat{I}(M) | a, C]}{\mathcal{K}},$$

wherein $\hat{I}(M)$ equals the mutual information between the clustering procedure and the predetermined categorization of images, $E[\hat{I}(M)|a,C]$ equals the penalty factor and is based on the number of clusters C generated by the clustering procedure, and on the predetermined categorization a, and wherein $\kappa$ is a normalization constant which depends only on the predetermined categorization a. Generation of AMI* will be described more fully below with respect to FIGS. 5A to 5F.

In step 407, a clustering procedure with a high clustering quality score is selected.

In step 408, the selected clustering procedure is output. In that regard, the output clustering procedure may be displayed to the user as in FIG. 1, or may simply be stored or saved at computing equipment 41 for later use in grouping the same images or similar images. The selected clustering procedure could also be output over a network. Of course, many other methods of outputting the selected clustering procedure are possible.

Generation of the clustering quality score (i.e., AMI*) will now be described more fully with respect to FIGS. 5A to 5F.

Turning to FIG. 5A, let $S=\{S_1, S_2, \ldots S_N\}$ be a set of N objects, where each $S_i$ belongs to one of R true categories, labeled $\mathcal{U}=\{U_1, U_2, \ldots U_R\}$. A clustering procedure produces a partition of these N objects into C clusters labeled $\mathcal{V}=\{V_1, V_2, \ldots V_C\}$.

The overlap between the true categories, and the clusters produced by a clustering procedure, can be summarized in the form of a contingency table M shown in FIG. 5A, where table element $M_{ij}$ is the number of objects belonging to category $U_i$ that was placed into cluster $V_j$. We also define $a_i$=row sums, and $b_j$=column sums. This is shown in FIG. 5A.

Formally, the mutual information I(X;Y) between discrete random variables X and Y is defined as $$I(X;Y) = \sum_{x \in X} \sum_{y \in Y} p(x,y) \log \frac{p(x,y)}{p(x)p(y)},$$

where $\mathcal{X}$ and $\mathcal{Y}$ are the domains of X and Y respectively. I(X;Y) is a symmetric measure that quantifies the information X and Y share. Entropy, denoted by H(X), is a measure of uncertainty associated with a random variable, X. Formally, $$H(X) = -\sum_{x \in X} p(x) \log p(x).$$

It can be verified that I(X;Y)=H(X)−H(X|Y)=H(Y)−H(Y|X). Thus, MI is a measure of how much knowing one of the variables reduces uncertainty of the other. I(X;Y) is upper-bounded by both H(X) and H(Y).

Using a statistical view, random variables U $\mathcal{U}$ can be used to represent the category, and $\mathcal{V}$ to represent the cluster, that an object belongs to. Then after observing a contingency table M, the following frequentist estimates are generated:

$$Pr(U = u_i) = \frac{\sum_{j=1}^{C} M_{ij}}{N} = \frac{a_i}{N},$$

$$Pr(V = u_j) = \frac{\sum_{i=1}^{R} M_{ij}}{N} = \frac{b_j}{N}, \text{ and}$$

$$Pr(U = u_i, V = v_i) = \frac{M_{ij}}{N}.$$

The mutual information between U and V can be estimated as $$\hat{I}(M) = \sum_{i=1}^{R} \sum_{j=1}^{C} \Theta(M_{ij}, a_i, b_j),$$

where $$\Theta(n, a, b) = \frac{n}{N} \log \frac{nN}{ab}.$$

When comparing two partitions, V and V' with C and C' clusters respectively, against a "true" partition U. If C=C', the MI of each of the two partitions to the true partition, I(U; V) and I(U; V'), is a fair measure for comparing these clustering procedures.

However, if C≠C' this might not be the case. For example, suppose there is comparison of 3 partitions, $V_1$, $V_2$ and $V_3$ of a dataset consisting of two objects from one category and two objects from another. FIG. 5B shows the contingency tables of $V_1$, $V_2$ and $V_3$ with respect to U, the "true" partition induced by the labels.

As shown in FIG. 5B, $V_1$ is the best possible clustering of the dataset whereas $V_3$ is a completely uninformative "clustering" since it placed each object in a separate "cluster". But it turns out that the mutual information for all the 3 contingency tables in FIG. 2 are the same (=H(U)). Additionally, any random partition of N objects into N categories, although completely uninformative, achieves the highest possible Mutual Information score with respect to the true clustering.

Accordingly, a more informative measure should include a correction term to account for the mutual information that would be obtained by chance. That is, in order to evaluate a procedure that partitions the data into C clusters, the evaluation should take into account how much better this procedure does, on average, than a procedure that randomly partitions the same data into C clusters.

Therefore, a penalty factor, EMI*, is calculated below. Then, EMI* can be used as a baseline that can be subtracted from MI to obtain a more meaningful measure to validate a clustering procedure given a "true" clustering. The difference is typically normalized to lie within a range, and the resulting measure can be called the adjusted mutual information, denoted by AMI*.

To calculate the penalty factor EMI*, given N objects, with $a_i > 0$ objects belonging to categories $U_i$ for i=1 ... R, it would be useful to compute the expectation of the mutual information estimate over all possible clusterings of these objects into exactly C clusters.

In that regard, $$EMI * E[\hat{I}(M) | a, C] = \sum_{M \in \mathcal{M}} \hat{I}(M) P(M | a, C),$$

where $\mathcal{M}$ is the set of all R×C contingency tables M, such that row i sums to $a_i$ for i=1 ... R, and such that columns sums are non zero, P(M|a, C) is calculated as:

$$P(M | a, C) = \frac{\mathcal{N}(M)}{\sum_{M \in \mathcal{M}} \mathcal{N}(M)},$$

where $\mathcal{N}(M)$ is the number of ways to cluster the given objects that result in the contingency table M. Plugging in the above, $$E[\hat{I}(M) | a, C] = \sum_{M \in \mathcal{M}} \left\{ \left[ \sum_{i=1}^{R} \sum_{j=1}^{C} \Theta(M_{ij}, a_i, b_j) \right] \left[ \frac{\mathcal{N}(M)}{\sum_{M \in \mathcal{M}} \mathcal{N}(M)} \right] \right\}$$

$$= \frac{1}{\sum_{M \in \mathcal{M}} \mathcal{N}(M)} \sum_{i=j}^{R} \sum_{j=1}^{C} \sum_{M \in \mathcal{M}} [\Theta(M_{ij}, a_i, b_j) \mathcal{N}(M)].$$

The summation over M above can be replaced with a summation over all possible values for $b_j$ and $M_{ij}$. There is not necessarily a need to sum over $a_i$ since it is a fixed quantity.

Considering the range of values that $b_j$ and $M_{ij}$ can take, since there must be at least one element in each column of M, $b_j$ has to be at least 1 and at most N−(C−1). Given $b_j$, $M_{ij}$ can be at most min($a_i$; $b_j$). Additionally, after filling the [i; j]th cell, the jth column must be filled with $b_j - M_{ij}$ elements from a pool of N−$a_i$ elements. Therefore, $M_{ij}$ should be at least ($a_i$+$b_j$−N)+, which is max(0; $a_i$+$b_j$−N).

To replace the summation over M as mentioned above, $\mathcal{N}(M)$ should be replaced with $\mathcal{N}(M_{ij}, a_i, b_j | C)$, where $\mathcal{N}(n, a, b_j | C)$ is the number of ways to cluster the given objects into exactly C clusters such that there are n elements in a particular cell, and the number of elements in the corresponding row and column are a and b respectively. With this transformation, $$E[\hat{I}(M) | a, C] =$$

$$\frac{1}{\sum_{M \in \mathcal{M}} \mathcal{N}(M)} \sum_{i=1}^{R} \sum_{j=1}^{C} \sum_{b=1}^{N-C+1} \sum_{n=(a_i+b-N)}^{min(a,b)} + [\Theta(n, a_i, b) \mathcal{N}(n, a_i, b | C)].$$

Since the categories of the objects are given, the denominator in the above equations is simply the number of ways to partition N distinguishable objects into C distinguishable non-empty bins, i.e.:

$$\sum_{M \in \mathcal{M}} \mathcal{N}(M) = S(N, C) \times C!,$$

where S denotes a Stirling number of the second kind.

Turning to FIG. 5C, $\mathcal{N}(n, a, b|C)$ can be calculated. As mentioned, this is the number of ways to cluster the given N objects into exactly C clusters so that a given cell contains n elements and there are a and b elements in its corresponding row and column respectively. Specifically, $$\mathcal{N}(n, a, b | C) = \binom{a}{b}\binom{N-a}{b-n} S(N-b, C-1)(C-1)!.$$

In addition, substituting into the above, the terms inside the summation are independent of j and hence the summation over j can be removed and the whole expression multiplied by C. Thus, $$E[\hat{I}(M) | a, C] = \sum_{i=1}^{R} \sum_{b=1}^{N-C+1} \sum_{n=max(1,a_1+b-N)}^{min(a_i,b)} \Theta(n, a_i, b) \Psi(n, a_i, b | C),$$

where

-continued $$\Psi(a, b, n \mid C) = \frac{\binom{a}{n}\binom{N-a}{b-n} S(N-b, C-1)}{S(N, C)}.$$

Once EMI* has been calculated, the adjusted mutual information can be calculated as $$AMI* = \frac{\hat{I}(M) - E[\hat{I}(M) \mid a, C]}{\mathcal{K}},$$

where $\mathcal{K}$ is a normalization constant which depends only on the predetermined categorization of images. Using one such choice for $\mathcal{K}$ we have $$AMI* = \frac{\hat{I}(M) - E[\hat{I}(M) \mid a, C]}{H(U) - E[\hat{I}(M) \mid a, R]}.$$

Figure 5D:
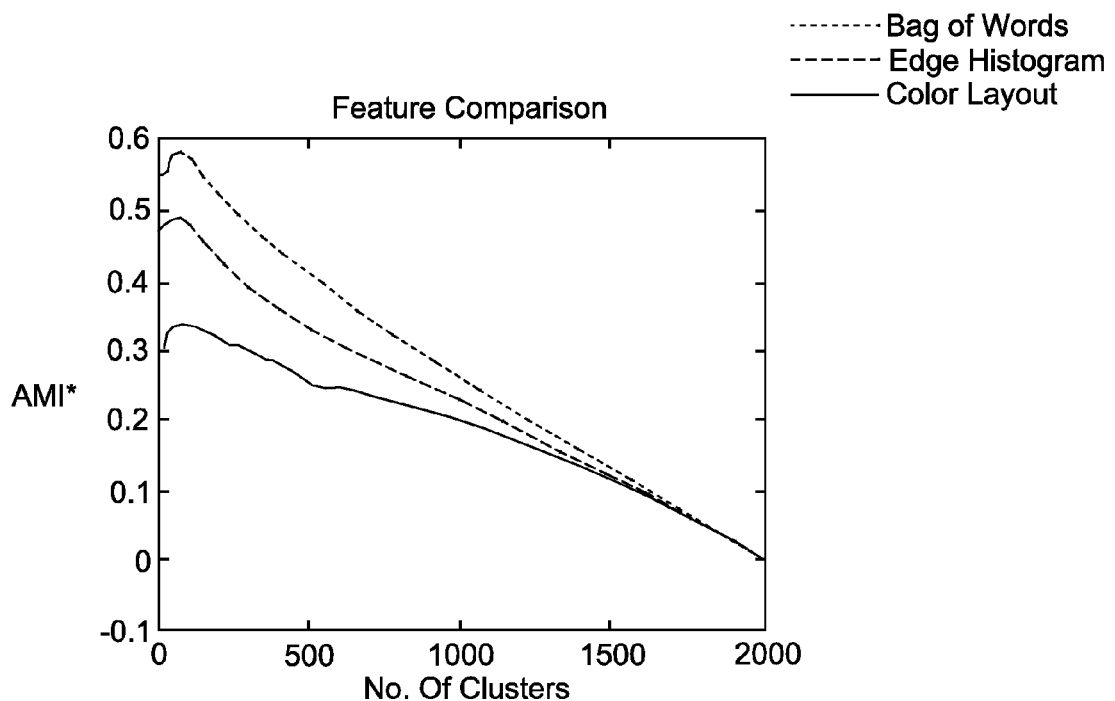
FIGS. 5D to 5F are diagrams depicting example results of clustering procedures according to an example embodiment.
Figure 5E:
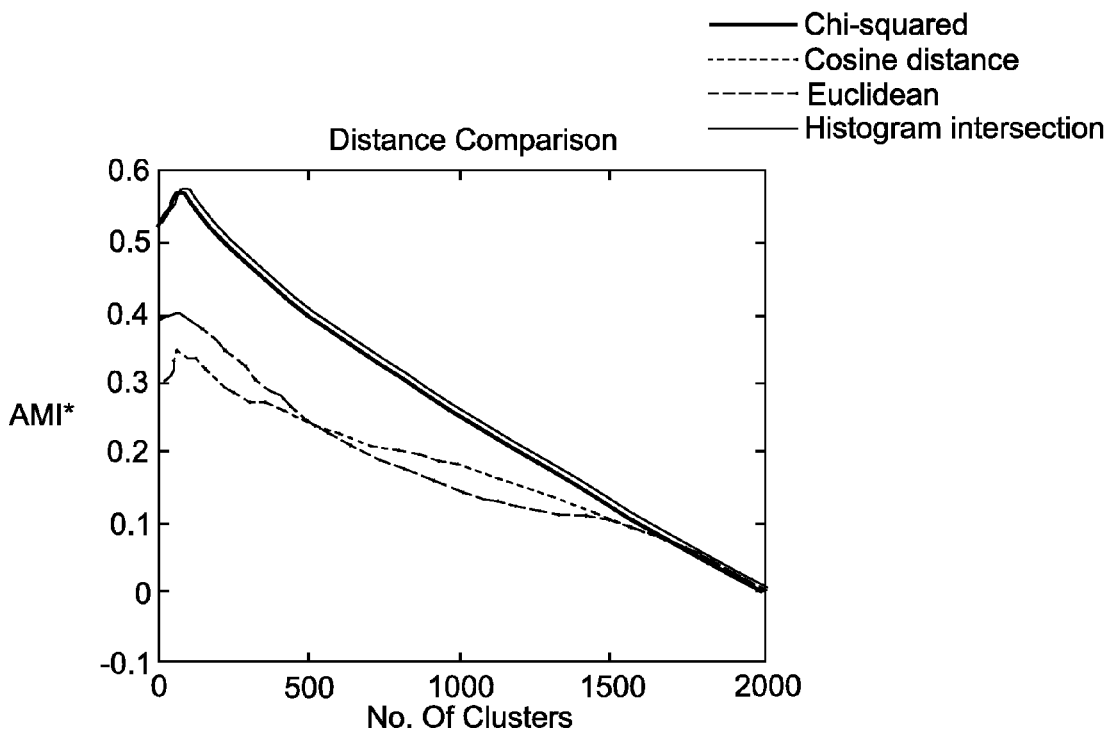
Figure 5F:
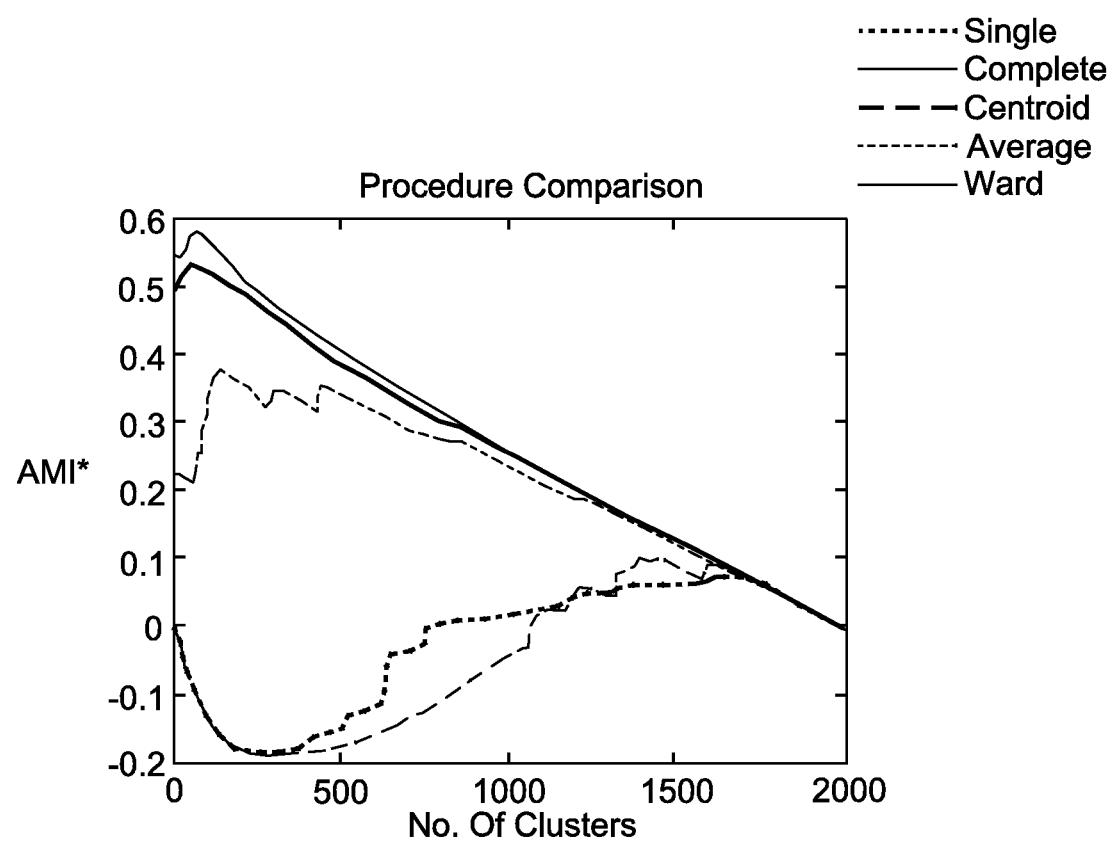

FIGS. 5D to 5F are diagrams depicting example results of clustering procedures according to an example embodiment. Specifically, FIG. 5D illustrates AMI* based on different input features and clusters produced. Meanwhile, FIG. 5E illustrates AMI* based on different distance comparisons and clusters produced. FIG. 5F illustrates AMI* based on example clustering procedures and clusters produced.

By comparing a set of clustering procedures against a fixed "true" categorization of images to generate respective scores for each clustering procedure, it is ordinarily possible to automatically choose a clustering procedure which will group images in a manner best approximating a grouping performed manually by a user.

As mentioned above, while the above process has been described with respect to images for purposes of conciseness, it should be understood that other embodiments could also operate on other objects. For example, other embodiments could be directed to selecting a clustering procedure for clustering audio files, or moving image files.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for measuring similarity between a set of clusters generated by a clustering procedure and a corresponding set of object labels, wherein the clustering procedure is for grouping a set of objects, the method comprising:
   applying a clustering procedure to the set of objects to cluster the objects into a first set of clusters;
   calculating a similarity index between the first set of clusters and the set of object labels;
   calculating an expected value of the similarity index, wherein the expected value of the similarity index is a value of the similarity index one would expect to obtain, on average, between a randomly generated second set of clusters and the object labels, wherein the randomness of the second set of clusters assumes that a set of first cluster sizes is different than a set of second cluster sizes; and
   adjusting the calculated similarity index by a penalty factor based at least in part on the expected value of the similarity index.

2. The method according to claim 1, wherein every possible way to cluster the objects into the randomly generated second set of clusters is assumed to be equally likely.

3. The method according to claim 1, wherein the similarity index is calculated using mutual information between the first set of clusters and the object labels.

4. The method according to claim 3, wherein an expected value of the mutual information is calculated according to $$EMI(a, C) = \sum_{i=1}^{R} \sum_{b=1}^{N-C+1} \sum_{n=max(1,a_i+b-N)}^{min(a_i,b)} \frac{n}{N} \log \frac{nN}{a_i b} \frac{\binom{a_i}{n}\binom{N-a_i}{b-n}\binom{N-b}{C-1}}{\binom{N}{C}},$$

wherein $a_i$, is a number of objects belonging to an i-th label for each i from 1 to R, R is a total number of object labels, C is a total number of clusters in the set of clusters, and N is a total number of objects.

5. The method according to claim 1, wherein the set of object labels is selected by a user.

6. The method according to claim 1, wherein the set of object labels is generated based on past categorizations of objects.

7. The method according to claim 1, wherein the set of object labels is generated using a pre-labeled learning set of objects.

8. The method according to claim 1, wherein applying clustering procedures comprises:
   extracting object features from each object in the set of objects;
   determining a comparison measure by which to compare respective features of the objects in the set of objects;
   comparing respective features of the objects in the set of objects based on the comparison measure, to determine differences between respective features of the objects; and
   outputting a group of measures representing the differences between respective features of the objects,
   wherein the first clustering procedure is applied to the set of objects based at least in part on the group of measures.

9. A system for measuring similarity between a first set of clusters generated by a first clustering procedure and a set of object labels, the system comprising:
   a first computer-readable medium configured to store computer-executable instructions; and
   one or more processors configured to cause the system to:
   retrieve a set of objects from one or more computer-readable media,
   apply the first clustering procedure to the set of objects to sort the objects into a first set of clusters, wherein the first set of clusters has a first number of clusters,
   retrieve the set of object labels from the one or more computer-readable media,
   generate a similarity index between the first set of clusters and the set of object labels,
   generate an expected value of the similarity index, wherein the expected value of the similarity index indicates an average value of the similarity index between randomly generated sets of clusters and the set of object labels, wherein the randomly generated sets of clusters have at most a same number of clusters as the first number of clusters, and wherein the randomness of the randomly generated sets of clusters assumes that a set of first cluster sizes is different than a set of the randomly generated cluster sizes; and adjust the calculated similarity index by a penalty factor that is based at least in part on the expected value of the similarity index.

10. The system according to claim 9, wherein the randomly generated sets of clusters are different from one another.

11. The system according to claim 9, wherein in the aggregate, the average value of the similarity index between the randomly generated sets of clusters and the set of object labels is the average of the similarity index between every possible arrangement of the objects into a number of clusters equal to the first number of clusters and the set of object labels.

12. The system according to claim 11, wherein the one or more processors are further configured to cause the system to generate the expected value of the similarity index according to $$EI(a, C) = \sum_{i=1}^{R} \sum_{b=1}^{N-C+1} \sum_{n=max(1,a_i+b-N)}^{min(a_i,b)} \frac{n}{N} \log \frac{nN}{a_i b} \frac{\binom{a_i}{n}\binom{N-a_i}{b-n}\binom{N-b}{C-1}}{\binom{N}{C}},$$

wherein $a_i$ is a number of objects belonging to an i-th label for each i from 1 to R, R is a total number of object labels, C is the first number of clusters, and N is a total number of objects.

13. One or more non-transitory computer-readable media storing instructions that, when executed by one or more computing devices, cause the one or more computing devices to perform operations comprising:

retrieving a set of objects from one or more computer-readable media;

generating a first set of clusters based on a first clustering procedure and the set of objects;

calculating a similarity index between the first set of clusters and a set of object labels;

calculating an expected value of the similarity index, wherein the expected value of the similarity index is a weighted average of possible values of the similarity index between a randomly generated set of clusters and the object labels, wherein the randomness of the randomly generated set of clusters assumes that a set of first cluster sizes is different than a set of the randomly generated cluster sizes; and modifying the calculated similarity index by a penalty factor that is based at least in part on the expected value of the similarity index.

14. The one or more computer-readable media of claim 13, wherein the expected value is a weighted average of the similarity index between the randomly generated set of clusters and the object labels.

15. The one or more computer-readable media of claim 13, wherein the weighted average assumes all possible randomly generated sets of clusters are equally likely.

* * * * *